(12) United States Patent
Wright et al.

(10) Patent No.: US 8,297,775 B2
(45) Date of Patent: Oct. 30, 2012

(54) MOTION ACTIVATED UTILITY LIGHT

(76) Inventors: Aaron C. Wright, Lantana, TX (US); Jimmy L. Wright, Decatur, TX (US)

( * ) Notice: Subject to any disclaimer, the term of this patent is extended or adjusted under 35 U.S.C. 154(b) by 391 days.

(21) Appl. No.: 12/424,345

(22) Filed: Apr. 15, 2009

(65) Prior Publication Data

US 2009/0261737 A1    Oct. 22, 2009

Related U.S. Application Data

(60) Provisional application No. 61/045,432, filed on Apr. 16, 2008.

(51) Int. Cl.
*F21V 21/08* (2006.01)
(52) U.S. Cl. .......... 362/103; 362/109; 315/312
(58) Field of Classification Search ........ 362/103, 362/109
See application file for complete search history.

(56) References Cited

U.S. PATENT DOCUMENTS

| | | | |
|---|---|---|---|
| 2,514,432 A | 7/1950 | Whitford | |
| 5,081,568 A | 1/1992 | Dong et al. | |
| 5,134,558 A | 7/1992 | Williams et al. | |
| 5,287,255 A | 2/1994 | Strodtman | |
| 5,905,441 A | 5/1999 | Klee et al. | |
| 6,142,951 A | 11/2000 | Park | |
| 6,179,431 B1 | 1/2001 | Chien | |
| 6,213,623 B1 | 4/2001 | Campman | |
| 6,293,684 B1 | 9/2001 | Riblett | |
| 6,371,625 B2 | 4/2002 | Campman | |
| 6,722,771 B1 | 4/2004 | Stephens | |
| 6,899,441 B2 | 5/2005 | Chen | |
| 7,011,423 B2 | 3/2006 | Chen | |
| 7,195,370 B2 * | 3/2007 | Riblett et al. | 362/120 |
| 7,261,456 B2 | 8/2007 | Liu | |
| 7,267,453 B2 * | 9/2007 | Chang et al. | 362/120 |
| 7,745,769 B2 * | 6/2010 | Tracy et al. | 250/205 |
| 2003/0021121 A1 * | 1/2003 | Pederson | 362/493 |
| 2004/0062039 A1 * | 4/2004 | Ahn | 362/192 |
| 2007/0064411 A1 | 3/2007 | Chang et al. | |
| 2007/0291473 A1 * | 12/2007 | Traynor | 362/106 |
| 2008/0007427 A1 * | 1/2008 | Stokes | 340/901 |
| 2008/0165006 A1 * | 7/2008 | Phillips | 340/572.1 |
| 2008/0218996 A1 * | 9/2008 | Galloway et al. | 362/103 |

* cited by examiner

*Primary Examiner* — Jacob Y Choi
*Assistant Examiner* — Anthony Arpin
(74) *Attorney, Agent, or Firm* — Conley Rose, P.C.; Kristin Jordan Harkins (57) ABSTRACT

A utility light is provided. The utility light comprises a first array of light sources having a first color facing in a first direction, a second array of light sources having a second color facing in a second direction that substantially opposes the first direction, a motion sensor, and an electronic controller to determine a first state based on an input received from the motion sensor, to operate the first array of light sources in the first state, to determine a second state based on the input received from the motion sensor, and to operate the second array of light sources in the second state.

20 Claims, 5 Drawing Sheets

MOTION ACTIVATED UTILITY LIGHT

CROSS-REFERENCE TO RELATED APPLICATIONS

The present application claims priority to and the benefit under 35 U.S.C. §119(e) of U.S. Provisional Application Ser. No. 61/045,432 filed Apr. 16, 2008 and entitled "Motion Activated Utility Light," hereby incorporated herein for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some common methods for directing traffic and controlling crowds include the use of hand signals and orange cones attached to flashlights. Providing clear and concise traffic and/or crowd control signals promotes public safety and the safety of the operator. Being able to reduce confusion and providing clear signals when directing traffic and/or controlling crowds may help to alleviate confusion, prevent accidents, and increase safety.

SUMMARY

In an embodiment, a utility light is disclosed. The utility light comprises a first array of light sources having a first color facing in a first direction, a second array of light sources having a second color facing in a second direction that substantially opposes the first direction, a motion sensor, and an electronic controller to determine a first state based on an input received from the motion sensor, to operate the first array of light sources in the first state, to determine a second state based on the input received from the motion sensor, and to operate the second array of light sources in the second state.

In another embodiment, a utility light is disclosed. The utility light comprises a housing, a first plurality of illuminators to radiate according to a first characteristic retained by the housing to face in a first direction, and a second plurality of illuminators to radiate according to a second characteristic retained by the housing to face in a second direction.

In another embodiment, a method of directing traffic is disclosed. The method comprises holding a motion activated utility light with a hand to achieve a first state of the motion activated utility light, wherein in the first state the motion activated utility light radiates a green light in a first direction, and rotating the motion activated utility light with the hand in substantially 180 degrees about an axis of the motion activated utility light to achieve a second state of the motion activated utility light, wherein in the second state the motion activated utility light radiates a red light in the first direction.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Embodiments are disclosed that relate to various tools that may be used to direct traffic and control crowds, including orange flashlight cones, traffic batons, hand signals, colored gloves, and hand held STOP & SLOW signs. In one embodiment, a portable multi-colored light system that can substantially improve traffic directing communication and safety is disclosed. Some of the embodiments or components may be applicable to other applications and uses outside of the field of traffic and/or crowd control.

Figure 1:
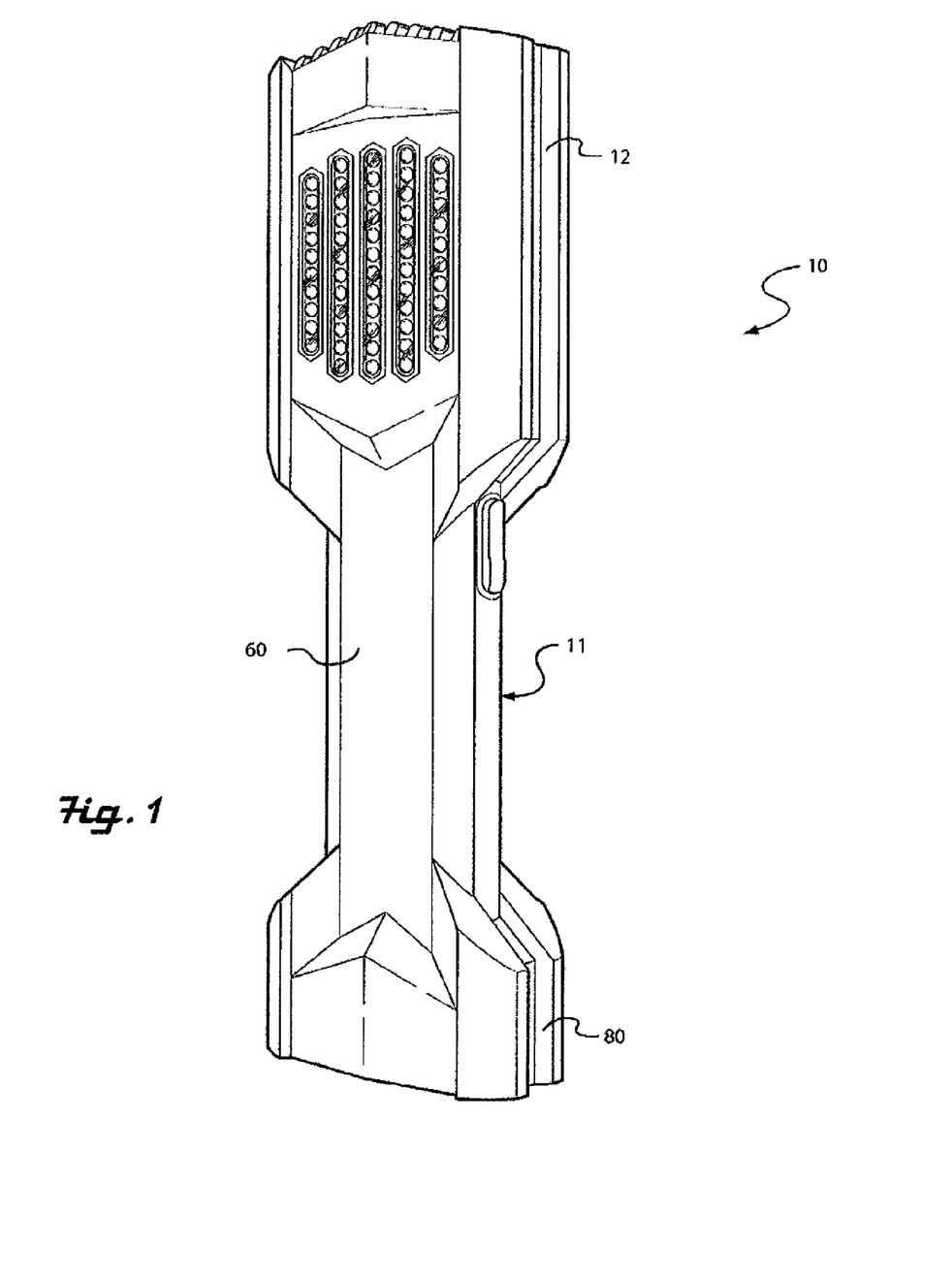
FIG. 1 is a perspective view of a Motion Activated Utility Light (MAUL) according to an embodiment of the disclosure.

Referring now to FIG. 1, a Motion Activated Utility Light (MAUL) 10 is depicted. In an embodiment, the MAUL 10 comprises a housing 11 having a handle portion 60, a head portion 12, and a base portion 80. In various embodiments, the housing 11 may be constructed of aluminum, steel, or other metals and/or alloys. In some embodiments, the housing 11 may be constructed of an injection molded plastic construction in a well-known manner. In some embodiments, the housing 11 may be constructed of fiberglass and/or a composite material. In other embodiments, however, the housing may be constructed of other suitable materials.

Figure 4:
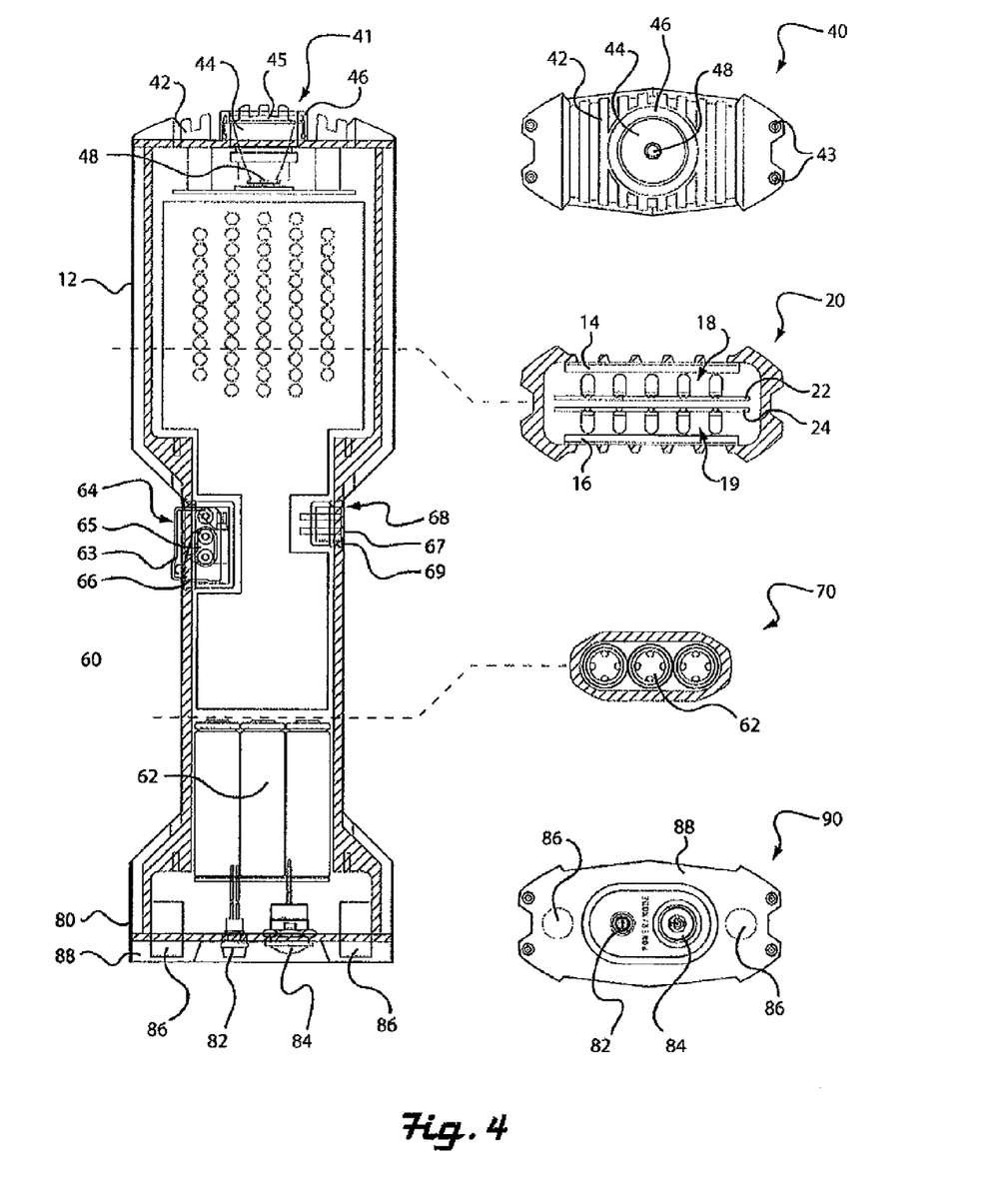
FIG. 4 illustrates multiple sectional views of the MAUL of FIG. 1, indicating some of the internal components, according to an embodiment of the disclosure.

Turning now to FIG. 4, in an embodiment, the handle portion 60 may comprise a trigger switch assembly 64 and a battery charger receptacle assembly 68. The handle portion 60 may be gripped so that an operator's finger can operate a trigger switch 65 and the palm of the hand faces the same general direction as the red/blue light array 18. The charger receptacle assembly 68 may be positioned on the opposite side of the handle portion 60 from the trigger switch in such a way that the trigger switch 65 will not interfere with the charging of the MAUL 10. In another embodiment, however, the MAUL 10 may not comprise the trigger switch assembly 64 and/or the battery charger receptacle assembly 68. In another embodiment, the trigger switch assembly 64 and/or the battery charger receptacle assembly 68 may be located in a different position on the MAUL 10 than the handle portion 60.

In an embodiment, the trigger switch assembly 64 comprises a switch housing 66, the trigger switch 65, and a switch actuator 63. The housing 66 may be constructed of any suitable material. In various embodiments, the housing 66 comprises anodized aluminum or high impact plastic constructed in a well-known manner. In some embodiments, the switch housing 66 is waterproof.

In an embodiment, the charger receptacle assembly 68 comprises a housing 69, one or more battery charger contacts 67, and an electrically isolating material around the contacts. The housing 69 may be constructed of any suitable material. In various embodiments, the housing 69 is constructed of anodized aluminum or high impact plastic in a well-known manner. In some embodiments, the housing 69 is waterproof.

The head portion 12 may comprise a red/blue light array 18 facing in a first direction, a green/amber light array 19 facing in a second direction, a spotlight assembly 41, or combinations thereof. In an embodiment, the red/blue light array 18 and the green/amber light array 19 may face in substantially opposing directions. The spotlight assembly 41 may comprise a heat sink 42, a spotlight 48, a lens 45, a lens holder 46, and a reflector 44. In an embodiment, the lens holder 46 may be suitable to being screwed down. The cross-sectional view of the light arrays 20 illustrates one manner of disposing or locating the red/blue light array 18 with respect to the green/amber light array 19. The spotlight assembly top view 40 shows the layout of the heat sink 42, the spotlight 48, the lens holder 46, the reflector 44, and a plurality of screw mounting locations 43.

Figure 2:
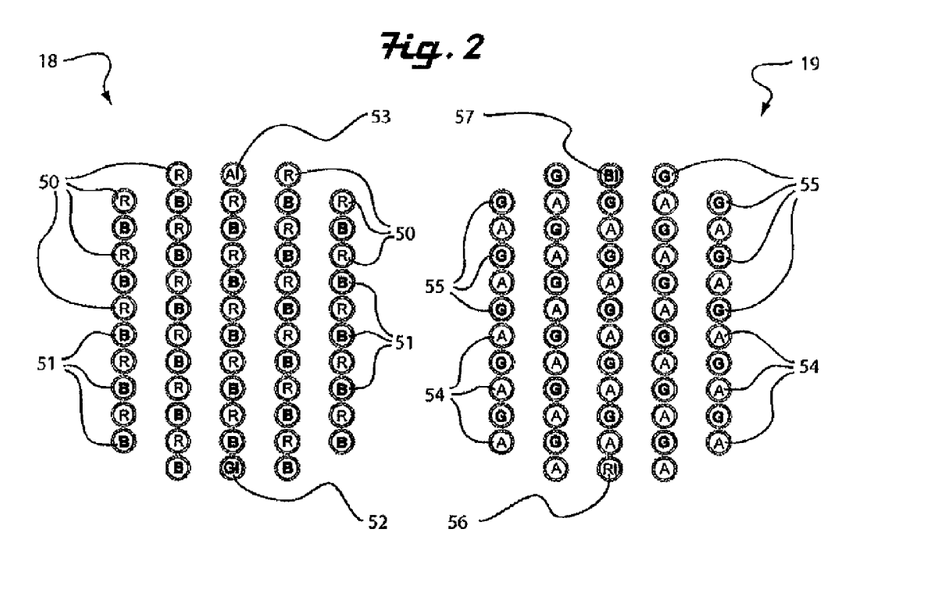
FIG. 2 is a front view of the red/blue light array and the green/amber light array showing their layout in a head portion of the MAUL according to an embodiment of the disclosure.

Turning now to FIG. 2, a plurality of red LEDs 50 and a plurality of blue LEDs 51 are depicted that comprise the red/blue light array 18. In some contexts, the red/blue light array 18 may be referred to as an array of light sources. In an embodiment, a red light array may be provided without a blue light array. In another embodiment, however, different types of light sources may be employed. In an embodiment, the LEDs 50, 51 are arranged in a semi rectangular array, which includes five vertical rows with alternating red LEDs 50 and blue LEDs 51 in each row. In an embodiment, the center row contains one green indicator LED 52 and one amber indicator LED 53 to indicate which lights are active on the green/amber light array 19, which may be turned away from the view of an operator of the MAUL 10. In some contexts, the green/amber light array 19 may be referred to as an array of light sources. In an embodiment, a green light array may be provided without an amber light array. Thus, the indicator LEDs 52, 53 provide visual feedback to the operator about which color lights on the green/amber light array 19 are activated. In various embodiments, other numbers of LEDs 50, 51, 52, 53 and other positional dispositions of LEDs 50, 51, 52, 53 may be employed.

A plurality of green LEDs 55 and a plurality of amber LEDs 54 are also depicted that comprise the green/amber light array 19. In another embodiment, however, different types of light sources may be employed. In an embodiment, the LEDs 55, 54 are arranged in a semi rectangular array, which includes five vertical rows with alternating green LEDs 55 and amber LEDs 54 in each row. In an embodiment, the center row contains one red indicator LED 56 and one blue indicator LED 57 to indicate which lights are active on the red/blue light array 18. Thus, the indicator LEDs 56, 57 provide visual feedback to the operator about which color lights on the red/blue light array 18 are activated. In various embodiments, other numbers of LEDs 55, 54, 56, 57 and other positional dispositions of LEDs 55, 54, 56, 57 may be employed.

In an embodiment, the light arrays 18, 19 comprise ultra-bright LEDs that are bright enough to be suitable for daylight operation. In an embodiment, the brightness of the light arrays 18, 19 is adjustable for the prevailing conditions, including nighttime. In an embodiment, a sensor detects an intensity of ambient light, and a processor adjusts the brightness of the light arrays 18, 19 based on the sensed intensity of ambient light.

Turning again to FIG. 4, in an embodiment, the spotlight assembly 41 may contain at least one white ultra-bright spotlight LED 48 or other light source and is facing out the top side of the head portion 12. The spotlight LED 48 may be mounted with a reflector 44, which directs the light emitting from the solid state light source 48 substantially out the top side of the head portion 12. In an embodiment, the spotlight LED 48 has adjustable display modes and brightness levels controlled by the trigger switch 65. In an embodiment, the spotlight assembly 41 may be shaped to prevent standing the MAUL 10 upright on the spotlight assembly 41, for example to prevent the powerful spotlight LED 48 from overheating and/or from accidentally being left powered on for extended periods.

In an embodiment, the base portion 80 comprises a power/mode switch 84, a battery/charger indicator light 82 (for example, in an embodiment, a red/green battery/charger indicator light), a layer of rubber overmold 88, and magnets 86. The MAUL 10 unit bottom view 90 illustrates what the operator sees when the head portion 12 is pointing towards the ground or otherwise away from the operator.

The operation of the two light arrays 18, 19 and the spotlight 48 depend on the operating mode of the MAUL 10. In an embodiment, there are four operating modes of the MAUL 10: a spotlight mode, a red/green traffic mode, a red/amber traffic mode, and a red/blue mode. In some contexts, the spotlight mode may be referred to as mode 1, the red/green traffic mode may be referred to as mode 2, the red/amber traffic mode may be referred to as mode 3, and the red/blue mode may be referred to as mode 4. In other embodiments, however, other operating modes and/or operating sub-modes may be promoted by the MAUL 10.

In an embodiment, upon powering up, the operating mode of the MAUL 10 is set to the spotlight mode. While in the spotlight mode, the red/green traffic mode is selected by quickly pressing and releasing the power/mode switch 84 one time. Each time the power/mode switch 84 is cycled, the MAUL 10 cycles to the next mode, for example from mode 1 to mode 2, from mode 2 to mode 3, from mode 3 to mode 4, and from mode 4 to mode 1. When the power/mode switch 84 is pressed and held, for a predefined time duration, the MAUL 10 will power off.

Figure 5:
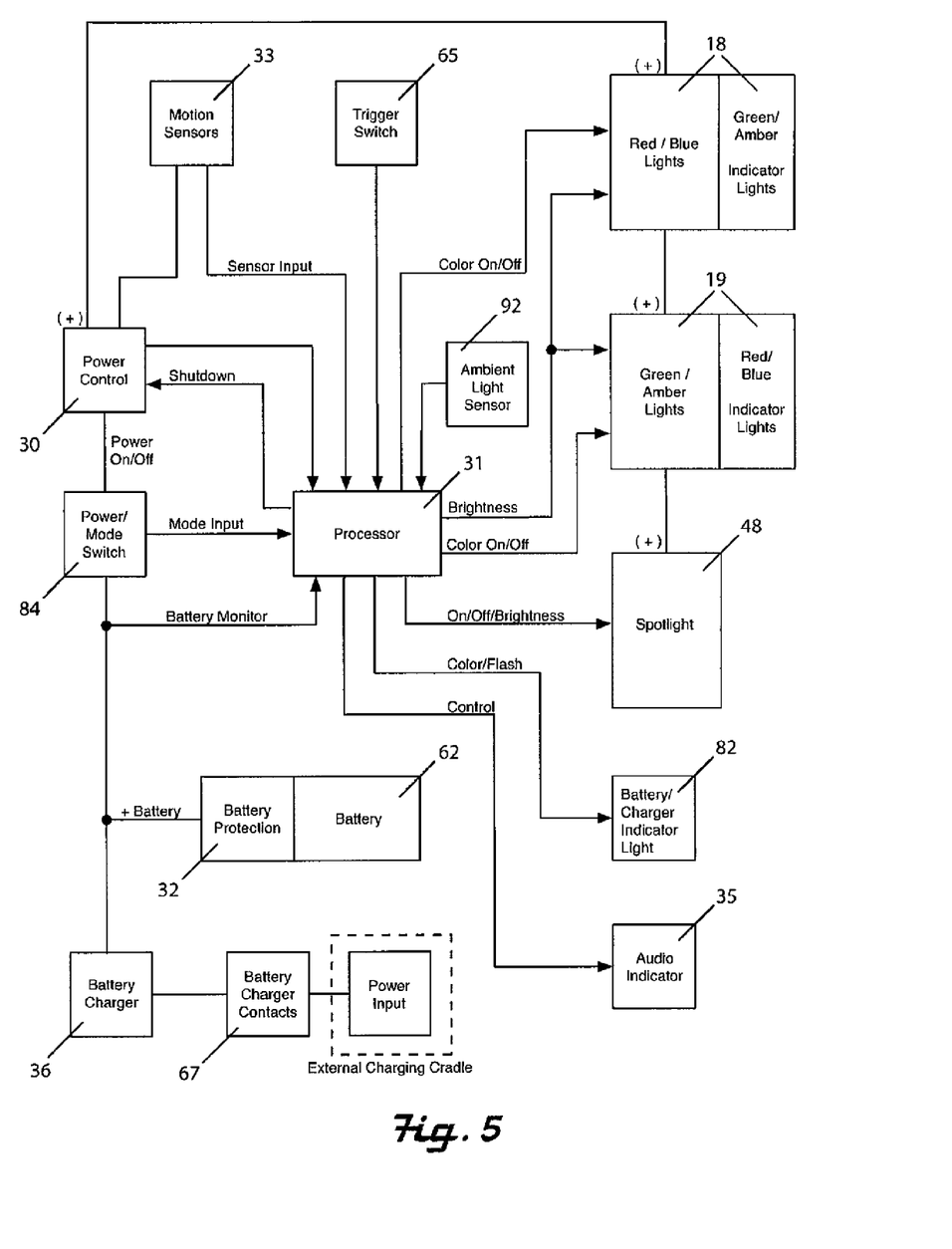
FIG. 5 is a block diagram of the MAUL according to an embodiment of the disclosure.

Turning now to FIG. 5, a block diagram of the MAUL 10 is provided. In an embodiment, the MAUL 10 may be powered by a lithium battery pack assembly 62, providing an output operating voltage between about 3.2 and about 4.2 volts. In an embodiment, the battery pack assembly 62 is configured to include up to three cells with a protection 32 circuit board and connector wiring. The circuit board includes circuitry to protect the battery pack assembly 62 from over charge, over discharge, over drain, and short circuit protection. The battery pack assembly cross sectional view 70 shown in FIG. 4 illustrates the arrangement of the cells in the battery pack assembly 62. In other embodiments, however, different power source configurations and dispositions may be employed. In other embodiments, other battery technologies may be employed.

The power control circuit 30 controls power distribution on the circuit boards. The power control circuit 30 monitors the power/mode switch 84 to turn on power to the MAUL 10. Powering off the MAUL 10 is controlled by one of multiple possible events including: the operator pressing and holding the power/mode switch 84 for a predefined time duration, the processor 31 turning the power off when the battery voltage is too low, the power control circuit 30 turning the power off if power is too low and the processor 31 is disabled, and the battery protection circuit 32 turning the power off if it detects a battery fault condition.

In an embodiment, the power/mode switch 84 may also be used to change the operating mode of the MAUL 10. If the power is on and the power/mode switch 84 is pressed and released in less than the specified power off time as determined by the processor 31, the operating mode of the MAUL 10 is changed to the next sequential operating mode.

The trigger switch 65 is monitored by the processor 31 and may provide ergonomic input to the operator to access features in a particular operating mode. The processor 31 counts and responds to two distinct press and release cycles: a quick press and release cycle and a long press and release cycle. A quick press and release cycle may be defined by occurring within less than a first predefined period of time. A long press and release cycle may be defined by occurring within greater than a second predefined period of time. In an embodiment, the first and second predefined periods of time may be different periods of time, with the first period of time being less than the second period of time. In another embodiment, the first and second predefined periods of time may be substantially equal.

The motion sensors 33 are monitored by the processor 31 providing hand/arm motion indications that direct the processor 31 as to what action to take regarding the illumination of the red/blue light array 18 and the green/amber light array 19. The appropriate action by the processor 31 depends on the MAUL 10 being held in the proper orientation with the handle portion 60 gripped around the elongated portion so that an operator's finger can operate the trigger switch 65 and the palm of the hand faces the same general direction as the red/blue light array 18, and the MAUL 10 faces the direction of the oncoming traffic. When gripped properly with the arm extended upwardly away from the operator's body, the processor 31, based on data from the motion sensors 33, measures angular rotation of the MAUL 10 and switches the light color. If the red lights 50 are being displayed to oncoming traffic, a change to display the green lights 55 may be selected by the rotation of the operator's hand/forearm by the required number of degrees, while also rotating above the minimum rotation speed. This results in the processor 31 turning off the red lights 50 to avoid flashing the eyes of the operator with undesirable light intensity and turning on the green lights 55, when the green display is substantially clear of the operator's direct view. In some contexts, the processor 31 may be said to be in a first state when the red lights 50 are switched on and/or operated while the processor 31 may be said to be in a second state when the green lights 55 are switched on and/or operated. In an embodiment, the motion sensors 33 do not provide absolute position in space but rather measure a rotation rate and degrees of rotation to determine the on/off timing of the light arrays 18, 19. In an embodiment, the MAUL 10 depends on the operator starting from a valid position and rotating the hand holding the MAUL 10 to the opposite facing direction while staying above the minimum rotating speed.

In an embodiment, the red lights 50 may comprise a first plurality of illuminators to radiate according to a first characteristic, and the green lights 55 may comprise a second plurality of illuminators to radiate according to a second characteristic. In embodiment, the first characteristic may be a first visible light wavelength, and the second characteristic may be a second visible light wavelength. In another embodiment, the first characteristic may be a first infrared light wavelength, and the second characteristic may be a second infrared light wavelength. In another embodiment, the first characteristic may be a radiation polarized in a first sense, and the second characteristic may be a radiation polarized in a second sense.

The motion sensors 33 may also support battery save operation with optional safety marker light display. In an embodiment, when the operator's hand/arm is pointed toward the ground, and with the MAUL 10 gripped properly, the MAUL 10 enters battery save mode where the red/blue light array 18 and the green/amber light array 19 are turned off to save battery power. Optionally, a safety marker light can illuminate intermittently to provide a distinguishable light to alert onlookers to the operator's position. When exiting from battery save mode, the motion sensors 33 provide the processor 31 the motion data required to determine if the red/blue light array 18 or the green/amber light array 19 should be turned on when the MAUL 10 reaches the operating position.

The processor 31 controls many actions of the MAUL 10. The processor 31 monitors input modules including the trigger switch 65, the motion sensors 33, and the power/mode switch 84 on which it bases its control of the output modules, the red/blue light array 18, the green/amber light array 19, the spotlight 48, the battery/charger indicator light 82, the audio indicator 35, and an ambient light sensor 92. The power control 30 is both an input and an output module. Some actions that may not be controlled by the processor 31 include the automatic power shut off provided by the battery protection module 32 and the power control module 30, which are caused by major fault conditions.

The red/blue LED lights 5, 51 and the green/amber LED lights 55, 54 may be turned on and off by the processor 31. In an embodiment, only one color is actively displayed at any given time, although various light arrays may be alternately displayed at various rates for desired visual effects. In an embodiment, the four colored light groups, red, blue, green, and amber, each have twenty-eight LEDs (twenty-seven LEDs on the main color side and one indicator LED on the opposite side). In an embodiment, each group of twenty-eight LEDs is electrically divided into four groups of seven LEDs, which are connected in series and driven by a constant current driver for the respective color, to provide uniformity of color and brightness. In an embodiment, the brightness may be controlled automatically by the processor 31 based on input from the ambient light sensor 92 and/or manually by use of the trigger switch 65. The processor 31 then sets the desired brightness via a pulse width modulation (PWM) signal. This technique allows for the lights to be a consistent color over the entire brightness range. In another embodiment, however, a different technique may be employed to control and/or modulate the brightness and color quality of the lights.

In an embodiment, the red/blue indicator lights 56, 57 and the green/amber indicator lights 52, 53 are located on substantially opposite sides of their respective colored light arrays 18 and 19. For example, if the red LED lights 50 are being displayed to oncoming traffic, or aiming away from the operator, the operator of the MAUL 10 will see the red indicator light 56 is lit, which assures the operator that the red LED lights 50 on the opposite side, are working. The red indicator light 56 is electrically connected in series to one of the four red groups of LEDs for the red LED driver. Each of the other colored light arrays and their respective indicators are connected in a similar fashion.

The battery/charger indicator light 82 may consist of a red/green bi-color LED. In an embodiment, the processor 31 monitors the battery voltage and displays five levels of battery capacity, as shown by the LED color and predetermined flash rate. In an embodiment, the battery/charger indicator light 82 may be implemented as a bi-color LED that indicates when the battery pack assembly 62 is charging and/or is fully charged. In another embodiment, however, the processor 31 may display different numbers of levels of battery capacity. In an embodiment, the battery/charger indicator light 82 may be a light or LED or a plurality of lights or LEDs to simply indicate that operable battery capacity is available.

In an embodiment, the audio indicator 35 is controlled by processor 31. It provides audible indications to the operator during interactive operations and predetermined changes in battery capacity.

In an embodiment, the battery charger 36 is used to recharge the lithium-ion battery pack assembly 62 at the appropriate voltage and current. The charger 36 may accept power from a 12V DC source or from an AC to DC adapter. The charging voltage is supplied through a quick connect attachment to the MAUL's battery charger contacts 67.

The battery/charger indicator light 82 may consist of a red/green bi-color LED. The red light is displayed during charging and the green light is displayed when charging is complete.

In an embodiment, the purpose of the MAUL 10 is to give the operator an all in one solution to portable lighting needs. One function of the MAUL 10 may be to direct traffic safely and efficiently. Traffic can be aircraft, automobiles, motorcycles, boats, people, ships, trucks, and anything else that moves around with human control. Locations or areas of use may be traffic accidents, loading docks, school zones, areas under construction, landing sites, public events, intersections, natural disaster areas, or any other area occupied by people or vehicles. Other functions of the MAUL 10 may include the spotlight mode and the red/blue light mode, where the spotlight 48 can be used instead of a separate flashlight, and the red/blue light can be used when the operator would like to get attention from onlookers and be identified as a law enforcement official.

Figure 3A:
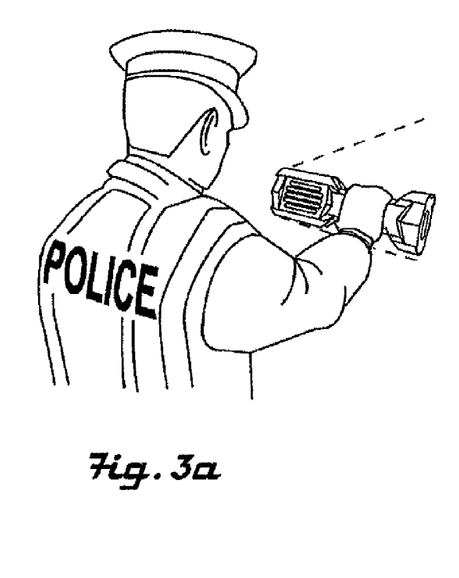
FIG. 3a illustrates the operation of a traffic mode of the MAUL of FIG. 1, indicating a stop signal with a red light array according to an embodiment of the disclosure.
Figure 3B:
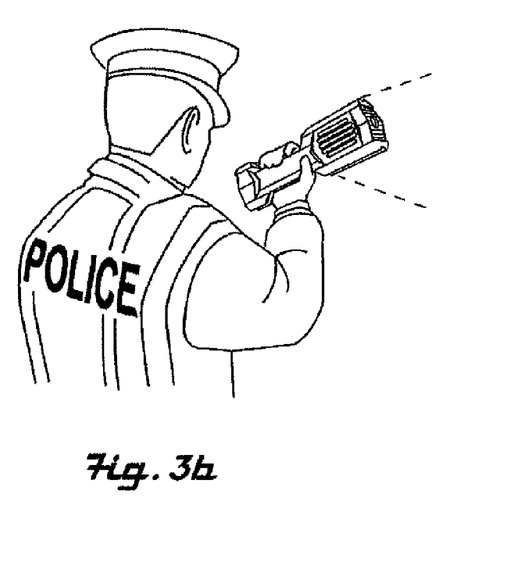
FIG. 3b illustrates the operation of the traffic mode of the MAUL of FIG. 1, indicating a go signal with a green or amber light array according to an embodiment of the disclosure.

Referring now to FIG. 3*a* and FIG. 3*b*, one example of operational use of the MAUL 10 is the traffic mode, such as when a police officer or other operator is directing traffic at an intersection, for example. The operator may be positioned with a clear line of sight to view all approaching traffic, such as in the middle of the intersection. To select traffic mode, the operator may press and release the power/mode switch 84. The MAUL 10 will turn on in mode 1, the spotlight mode. The operator may then perform a quick press/release of the power/mode switch 84 to change to mode 2, the red/green traffic mode. When the MAUL 10 is down by the operator's side and not moving, it may display intermittently flashing amber lights to alert onlookers of the operator's position.

When the operator is ready to give a stop signal/red light, the operator will lift the hand/forearm holding the MAUL 10, palm turned facing the ground, and arm extended in the direction of the oncoming traffic, in a similar fashion to traditional hand signaling methods. When the arm is nearly in its final position, extended and perpendicular to the ground, the palm of the hand should be facing the oncoming traffic as shown in FIG. 3*a*. This will activate the red light display 50 without the operator pressing buttons or switches, and promotes the operator controlling the MAUL 10 using his or her hands/arms similarly to traditional hand signaling methods.

When the operator is ready to give a go signal/green light, and the MAUL 10 is down by his or her side in battery save mode, the operator will lift the hand/forearm holding the MAUL 10, palm turned facing the sky, and arm extended in the direction of the oncoming traffic, in a similar fashion to traditional hand signaling methods. When the arm approaches its final position, the palm of the hand should be facing the operator, the back of the hand facing oncoming traffic, and the elbow should have nearly a 90-degree bend as shown in FIG. 3*b*. This will activate the green light display 55 without the operator pressing any buttons or switches, and allows the operator to move his or her hands/arms similar to traditional hand signaling methods.

If the operator is currently displaying a red light for stop as shown in FIG. 3*a*, and would like to signal a green light for go as shown in FIG. 3*b*, then while still signaling in the same direction, the operator will simply bend his or her elbow to approximately a 90-degree angle, while at the same time rotating his or her hand/forearm 180 degrees while keeping his or her fingers pointed to the sky. The operator's palm will go from facing traffic to now facing the operator as shown in FIG. 3*b*. The red light will turn off and the green light will turn on automatically without the operator pressing any buttons or switches, and this allows the operator to move his or her hands/arms similar to traditional hand signaling methods.

If the operator is currently displaying a green light for go as shown in FIG. 3*b*, and would like to signal a red light for stop as shown in FIG. 3*b*, then while still signaling in the same direction, the operator will simply extend his or her arm out, while at the same time rotating his or her hand/forearm 180 degrees while keeping his or her fingers pointed to the sky. The operator's palm will go from facing the operator to now facing traffic as shown in FIG. 3*a*. The green light will turn off and the red light will turn on automatically without the operator pressing any buttons or switches, and this allows the operator to move his or her hands/arms similar to traditional hand signaling methods.

If the operator prefers, the MAUL 10 may be configured, in the options menu, to a manual switching method. This mode, when on, will turn on the red LEDs 50 automatically when the MAUL 10 is raised regardless of what position it is facing. The operator presses and holds the trigger switch 65 to signal the green LEDs 55. The reason for this optional manual mode is to give the operator more control as to when and where the lights change color. This mode also requires appropriate timing on the operator's behalf in order not to shine the lights in his or her eyes while changing signal colors. A built in time delay is provided between signal changes to prevent this. When the operator releases the trigger switch 65 the green LEDs 55 will turn off and the red LEDs 50 will automatically turn on.

To operate in the red/amber traffic mode, while the MAUL 10 is off, the operator must press and release the power/mode switch 84. The MAUL 10 will turn on in mode 1, the spotlight mode. The operator will then perform two quick press and releases of the power/mode switch 84 to change to mode 2, the red/green traffic mode and then to mode 3, the red/amber traffic mode. The operator will direct traffic in the same fashion as the red/green traffic mode described previously except amber LED lights 54 will take the place of the green LED lights 55.

To operate in the spotlight mode, while the MAUL 10 is off, the operator must press and release the power/mode switch 84. The MAUL 10 will turn on in mode 1, the spotlight mode. The battery save mode does not work in spotlight mode such that when the operator lowers his or her hand/forearm, the spotlight 48 will remain on. There are three levels of brightness and three different operating modes while in spotlight mode. To cycle through the brightness levels, the operator performs a quick press and release of the trigger switch 65. To cycle through the operating modes of the spotlight mode, the operator presses and holds the trigger switch 65 for a predefined amount of time. The three different modes are spotlight mode, strobe/flash mode, and S.O.S. mode. The operator will be able to adjust the brightness of each of the three spotlight modes.

To operate in the red/blue mode, while the MAUL 10 is off, the operator presses and releases the power/mode switch 84. The MAUL 10 will turn on in mode 1, the spotlight mode. The operator will then perform three quick press and releases to change to mode 2, the red/green traffic mode and then to mode 3, the red/amber traffic mode and then to mode 4, the red/blue mode. The battery save mode does not work in red/blue mode such that when the operator lowers his or her hand/forearm, the red/blue lights will remain on. There are three levels of brightness, and two different operating modes while in red/blue mode. To cycle through the brightness levels, the operator will perform a quick press and release of the trigger switch 65. To cycle through the operating modes of the red/blue mode, the operator will press and hold the trigger switch 65 for a predefined amount of time. The two different modes are red/blue mode and a road flare mode. The red/blue mode will act like the well-known lights seen on police vehicles and will display quick alternating flashes of red and blue LED lights. This mode can be used while a police officer is issuing traffic violations, for example, to provide passersby awareness of the officer's presence. The road flare mode will lot the officer set the MAUL 10 down and display a unique flashing pattern of the red LEDs 50. The intended use is to attract attention and alert passersby to proceed with caution. The operator will be able to adjust the brightness of each of the two red/blue modes.

The operator will have a battery/charger indicator light 82 in view while the MAUL 10 is down by his or her side, which allows for a status check with a quick look down toward the MAUL 10. In an embodiment, there are five levels of power indication: solid green showing that the battery has a full charge or at least 70% of usable power, slow flashing green that comes on when approximately 70% of usable power remains, fast flashing green that comes on when approximately 40% of usable power remains, slow blinking red that shows the battery has approximately 10% of usable power remaining, and solid red that indicates the battery is nearly discharged and will shutdown soon. In another embodiment, other battery capacity indications may be provided. In an embodiment, an audio indicator 35 will alert the operator when the MAUL 10 enters the flashing red and solid red battery light mode. This helpful alert provides a backup notification in case the operator is not visually monitoring the battery/charger indicator light 82.

In addition to the battery save mode, the MAUL 10 also has a built in auto-shut off timer (red/green and red/amber traffic modes only) that will turn off the MAUL 10 electronically so the MAUL 10 is not accidentally left on to drain the battery. After a predetermined amount of time, the MAUL 10 will begin to flash and beep ten times to alert the operator it is about to shut power off. If the operator takes no action, the MAUL 10 will shut off. If however, the operator presses the trigger switch 65 or the power/mode switch 84, before it shuts down, the MAUL 10 will remain on and reset the internal auto shut off timer.

To aid the operator with multiple placement positions, the MAUL 10 will have magnets 86 in the base portion 80 of the MAUL 10. The MAUL 10 unit bottom view 90 of FIG. 4 shows the magnets 86 positions relative to the power/mode switch 84 and the battery/charger indicator light 82.

To prevent the magnets 86 from scarring delicate surfaces, like paint on vehicles, in an embodiment, a layer of rubber overmold 88 may cover the magnets 86 and not expose them. The rubber overmold 88 will also help to absorb some of the impact if the operator were to drop the MAUL 10 on its base portion 80. There will be a cutout in the layer of rubber overmold 88 to allow access to the battery/charger indicator light 82 and the power/mode switch 84 as seen in the MAUL 10 unit bottom view 90.

Figure 6A:
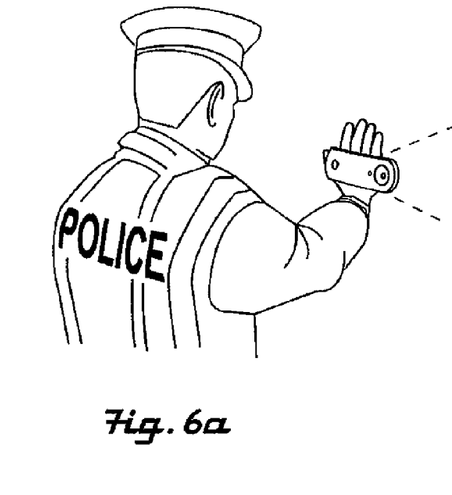
FIG. 6a depicts a hand-mounted embodiment of the MAUL, shown in a representative first operational hand position.
Figure 6B:
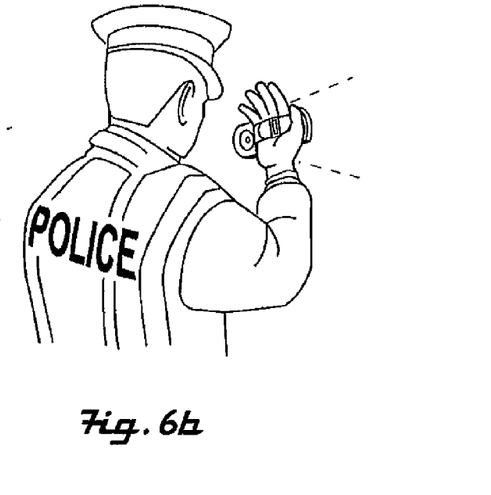
FIG. 6b depicts the hand-mounted MAUL of FIG. 6b, shown in a representative second operational hand position.

Turning now to FIG. 6a and FIG. 6b, in another embodiment, the MAUL 10 may be provided in a hand-mounted configuration rather than the hand-held configuration of FIG. 1. In the embodiment depicted in FIG. 6a and FIG. 6b, the MAUL 10 comprises a body portion that extends beyond the width of the operator's hand and provides different colored LEDs on opposing sides of the body, such as at least one green LED on one side of the body and at least one red LED on the opposing side of the body. The hand-mounted configuration of the MAUL 10 may attach to the operator's hand via an adjustable strap, belt or other attachment means. The body of the hand-mounted MAUL 10 may be lightweight, thereby allowing the operator to operate the hand-mounted MAUL 10 through possibly long work shifts without undue fatigue.

In various embodiments, the hand-mounted configuration of the MAUL 10 provides fewer operational modes, substantially the same number of operational modes, more operational modes, or different operational modes than the held-held configuration of the MAUL 10 shown in FIG. 1. Moreover, the operational modes of the hand-mounted MAUL 10 may provide substantially the same or different functionality as compared to the operational modes of the hand-held MAUL 10. FIG. 6a and FIG. 6b depict the hand-mounted MAUL 10 in representative operational hand positions. In particular, FIG. 6a depicts the hand-mounted MAUL 10 in a stop hand position and FIG. 6b depicts the hand-mounted MAUL 10 in a go hand position.

Figure 7A:
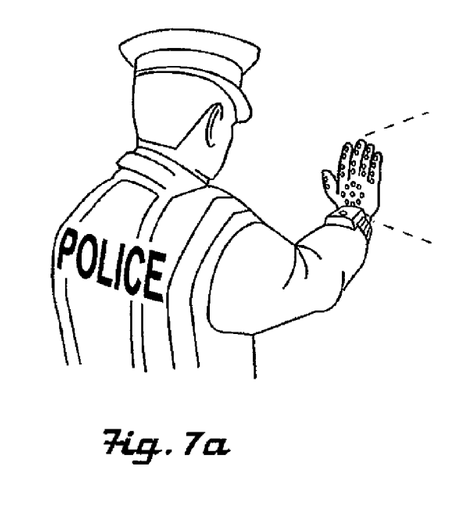
FIG. 7a depicts a glove-like embodiment of the MAUL, shown in a representative first operational hand position.
Figure 7B:
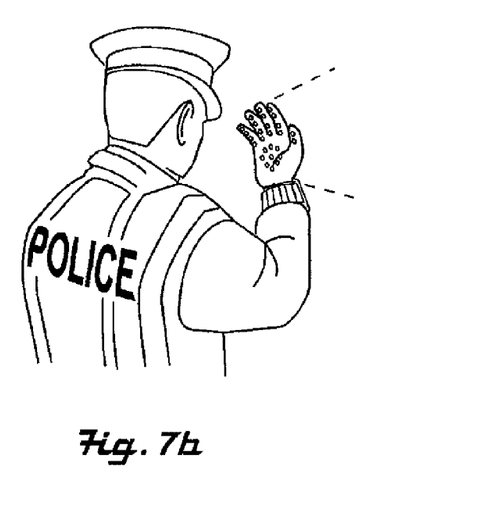
FIG. 7b depicts the glove-like MAUL of FIG. 7a, shown in a representative second operational hand position.

Turning now to FIG. 7a and FIG. 7b, in a different embodiment, the MAUL 10 may be provided in a glove-like configuration rather than the hand-held configuration of FIG. 1 or the hand-mounted configuration of FIG. 6a and FIG. 6b. In the embodiment depicted in FIG. 7a and FIG. 7b, the glove-like MAUL 10 comprises a glove-like structure coupled with an electronic wrist mounted package. The glove-like structure may comprise any variety of suitable fabrics to cover or partially cover the hand and a plurality of different colored LEDs mounted on a palm side and on a back side, respectively. In some contexts, the glove-like structure may be referred to as a housing. In one embodiment, the glove-like structure comprises a plurality of red LEDs on the palm side and a plurality of green LEDs on the back side. The glove-like structure may also comprise one or more motion detectors. The electronic wrist mounted package is in communication with the LEDs and with the motion detector. In an embodiment, the fabric may provide thermal insulation to protect an operator's hand from heat radiated by the green and red LEDs as well as to protect the hand from the elements, such as from the cold. The glove-like structure may be comprised of a single layer or multiple layers of fabric or other suitable material. In an embodiment, the MAUL 10 may comprise a mitten-like structure rather than a glove-like structure. In some contexts, the mitten-like structure may be referred to as a housing. In an embodiment, the glove-like structure and/or mitten-like structure may retain the green and red LEDs while the battery, the processor, the motion sensor, and other components may be retained within a wrist band that is in communication with the LEDs.

In various embodiments, the glove-like configuration of the MAUL 10 provides fewer operational modes, substantially the same number of operational modes, more operational modes, or different operational modes than other embodiments of the MAUL 10. Moreover, the operational modes of the glove-like embodiment of MAUL 10 may provide substantially the same or different functionality as compared to the operational modes of other embodiments of the MAUL 10. FIG. 7a and FIG. 7b depict the glove-like embodiment of the MAUL 10 in representative operational hand positions. In particular, FIG. 7a depicts the glove-like MAUL 10 in a stop hand position and FIG. 7b depicts the glove-like MAUL 10 in a go hand position. These statements apply, likewise, to a mitten-like configuration of the MAUL 10.

In the embodiments depicted and described herein, the MAUL 10 is presented as a standalone device. However, in other embodiments, the MAUL 10 may operate as a remote control device whereby the hand/arm motions of the operator trigger wireless commands that direct the operation of separate light sources, such as mounted street lights or a tripod mounted light, for example. In other embodiments, the MAUL 10 may operate as both a standalone device and also as a remote control device for a separate light source to provide synchronized signaling, for example.

The foregoing descriptions of specific embodiments of the MAUL 10 apparatus and methods of use have been presented for purposes of illustration and description and are not intended to be exhaustive or to limit the disclosure to the precise forms disclosed. Obviously many other modifications and variations are possible. In particular, the specific type and quantity of LEDs, operating modes and methods could be varied as well as other aspects of the MAUL 10 apparatus and methods.

While various embodiments of the MAUL 10 apparatus and methods of use have been shown and described herein, modifications may be made by one skilled in the art without departing from the spirit and the teachings of the disclosure. The embodiments described are representative only, and are not intended to be limiting. Many variations, combinations, and modifications of the apparatus and methods disclosed herein are possible and are within the scope of the disclosure. Accordingly, the scope of protection is not limited by the description set out above, but is defined by the claims which follow, that scope including all equivalents of the subject matter of the claims.

What is claimed is:

1. A utility light, comprising:
   a housing;
   a first plurality of illuminators to radiate according to a first characteristic retained by the housing to face in a first direction;
   a second plurality of illuminators to radiate according to a second characteristic retained by the housing to face in a second direction;
   a motion sensor that senses rotation of the housing about an axis substantially vertical to the surface of the earth; and
   a controller that switches the first and/or second plurality of illuminators based on an input received from the motion sensor, wherein the input provides an indication of the rotation of the housing about the axis substantially vertical to the surface of the earth, and wherein the controller turns off the first plurality of illuminators in response to a first amount of rotational motion in excess of a pre-defined minimum rate of rotational motion and turns on the second plurality of illuminators in response to a second amount of rotational motion, wherein the difference between the first amount of rotational motion and the second amount of rotational motion defines a rotational dead-band in which both the first and second plurality of illuminators are turned off, whereby shining light from the first or second plurality of illuminators into the eyes of an operator of the utility light is avoided.

2. The utility light of claim 1, wherein the second direction is substantially opposite to the first direction.

3. The utility light of claim 1, wherein the first characteristic is a first wavelength of light and the second characteristic is a second wavelength of light.

4. The utility light of claim 1, wherein the housing comprises one of a glove structure or a mitten structure.

5. The utility light of claim 1, further comprising a control switch, wherein the controller controls the utility light based on being in one of a first operation mode, a second operation mode, a third operation mode, and a fourth operation mode and transitions from the first operation mode to the second operation mode in response to an activation of the control switch, transitions from the second operation mode to the third operation mode in response to an activation of the control switch, transitions from the third operation mode to the fourth operation in response to an activation of the control switch, and transitions from the fourth operation mode to the first operation mode in response to an activation of the control switch.

6. The utility light of claim 5, wherein an activation of the control switch for a time duration less than a first predefined e interval causes the controller to transition between modes and an activation of the control switch for a duration greater than the predefined time interval causes the controller to power off the utility light.

7. The utility light of claim 5, further comprising a secondary control switch, wherein the controller controls one or more secondary operation modes within any of the primary first, second, third, and fourth operation modes.

8. The utility light of claim 1, wherein the first characteristic is a first or third wavelength of light and the second characteristic is a second or fourth wavelength of light.

9. The utility light of claim 1, further comprising a magnet o aid the operator with multiple placement positions.

10. The utility light of claim 1, wherein the motion sensor further senses rotation of the housing about an axis substantially horizontal to the surface of the earth and wherein the controller turns off the first plurality of illuminators and the second plurality of illuminators in response to a first rotational movement through at least a predefined amount of angular displacement about the axis substantially horizontal to the earth.

11. The utility light of claim 10, wherein the controller selects one of the first plurality of illuminators or the second plurality of illuminators to turn on in response to a second rotational movement through at least a predefined amount of angular displacement about an axis substantially horizontal to the earth that is opposite to the first rotational movement and turns on the selected plurality of illuminators.

12. The utility light of claim 1, further comprising at least one disposable battery.

13. The utility light of claim 1, further comprising a rechargeable battery.

14. The utility light of claim 13, further comprising a battery charger receptacle and a battery charging circuit coupled to the rechargeable battery.

15. The utility light of claim 14, wherein the battery charging circuit protects the rechargeable battery from over charge, over discharge, over drain, and short circuit.

16. The utility light of claim 13, further comprising a battery charger indicator light.

17. The utility light of claim 16, wherein the controller further monitors a voltage of the rechargeable battery and controls the battery charger indicator light to indicate five levels of battery capacity.

18. The utility light of claim 1, wherein the first plurality of illuminators comprise at least one light emitting diode (LED).

19. The utility light of claim 1, further comprising a spotlight.

20. The utility light of claim 19, wherein the spotlight comprises an ultra-bright light emitting diode (LED).

* * * * *